United States Patent
Iijima et al.

[19]

[11] Patent Number: 6,118,504
[45] Date of Patent: *Sep. 12, 2000

[54] DISPLAY DEVICE AND ELECTRONIC APPARATUS COMPRISING THE SAME

[75] Inventors: Chiyoaki Iijima; Toshihiko Tsuchihashi, both of Nagano-ken, Japan

[73] Assignee: Seiko Epson Corporation, Nagano, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,152

[22] Filed: Aug. 19, 1997

[30] Foreign Application Priority Data

Aug. 23, 1996 [JP] Japan ................................. 8-222563
May 9, 1997 [JP] Japan ................................. 9-119342

[51] Int. Cl.[7] .................................................. G02F 1/1335
[52] U.S. Cl. ................................................. 349/96; 349/71
[58] Field of Search .......................... 349/115, 96, 98, 349/101, 99, 71, 74, 80

[56] References Cited

U.S. PATENT DOCUMENTS

| | | | |
|---|---|---|---|
| 4,054,368 | 10/1977 | Krueger et al. ...................... | 350/160 |
| 4,882,617 | 11/1989 | Vriens ................................ | 358/60 |
| 4,974,219 | 11/1990 | Korth ................................. | 369/13 |
| 5,325,218 | 6/1994 | Willett et al. ....................... | 359/53 |
| 5,686,979 | 11/1997 | Weber et al. ....................... | 349/96 |
| 5,751,385 | 5/1998 | Heinze .............................. | 349/61 |

FOREIGN PATENT DOCUMENTS

| | | |
|---|---|---|
| WO 95/17303 | 6/1995 | WIPO . |
| WO 95/17691 | 6/1995 | WIPO . |
| WO 95/17692 | 6/1995 | WIPO . |
| WO 95/17699 | 6/1995 | WIPO . |
| WO 95/27919 | 10/1995 | WIPO . |
| WO 96/19347 | 6/1996 | WIPO . |
| WO 97/01439 | 1/1997 | WIPO . |
| WO 97/01440 | 1/1997 | WIPO . |
| WO 97/01610 | 1/1997 | WIPO . |
| WO 97/01726 | 1/1997 | WIPO . |
| WO 97/01774 | 1/1997 | WIPO . |
| WO 97/01778 | 1/1997 | WIPO . |
| WO 97/01780 | 1/1997 | WIPO . |
| WO 97/01781 | 1/1997 | WIPO . |
| WO 97/01788 | 1/1997 | WIPO . |
| WO 97/01789 | 1/1997 | WIPO . |
| WO 97/07653 | 2/1997 | WIPO . |

OTHER PUBLICATIONS

M. F. Weber, "Retroreflecting Sheet Polarizer," *SID 92 Digest*, pp. 427–429.

*Primary Examiner*—William L. Sikes
*Assistant Examiner*—Walter Malinowski
*Attorney, Agent, or Firm*—Oliff & Berridge, PLC

[57] ABSTRACT

A display device is provided which produces a bright display and prevents parallax. Aluminum electrodes, color filters, a polarized light separator and a diffusion layer are provided in this order between a glass substrate and a STN liquid crystal inward of the glass substrate. A polarized light separator is used in which, of the light incident on the STN liquid crystal 50 side, a linearly-polarized light component in a predetermined second direction is transmitted as linearly-polarized light in the second direction, and a linearly-polarized light component in a third direction perpendicular to the predetermined second direction is reflected, and the light incident on a same side as the aluminum electrodes is emitted as linearly-polarized light in the second direction to a same side as the STN liquid crystal.

35 Claims, 8 Drawing Sheets

DISPLAY DEVICE AND ELECTRONIC APPARATUS COMPRISING THE SAME

BACKGROUND OF THE INVENTION

1. Field of Invention

The present invention relates to a display device, and particularly to a reflection type liquid crystal display device, and an electronic apparatus comprising the reflection type liquid crystal display device.

2. Description of Related Art

For a conventional liquid crystal display device which employs a transmission polarization axis changing optical element such as a TN (Twisted Nematic) liquid crystal, a STN (Super-Twisted Nematic) liquid crystal, or the like in which the polarization axis is rotated, a structure is used in which the transmission polarization axis changing optical element is held between two polarizers, and there is thus the problem of low utilization efficiency of light, particularly, the problem of a dark display in a reflection type display device.

SUMMARY OF THE INVENTION

An object of the present invention is to provide a display device which employs a transmission polarization axis changing optical element and which can provide a bright display.

Another object of the present invention is to provide a display device, or an electronic apparatus comprising the display device which can prevent the occurrence of double display, i.e., parallax.

The principle of the present invention will be described with reference to FIGS. 1 and 2.

Figure 1:
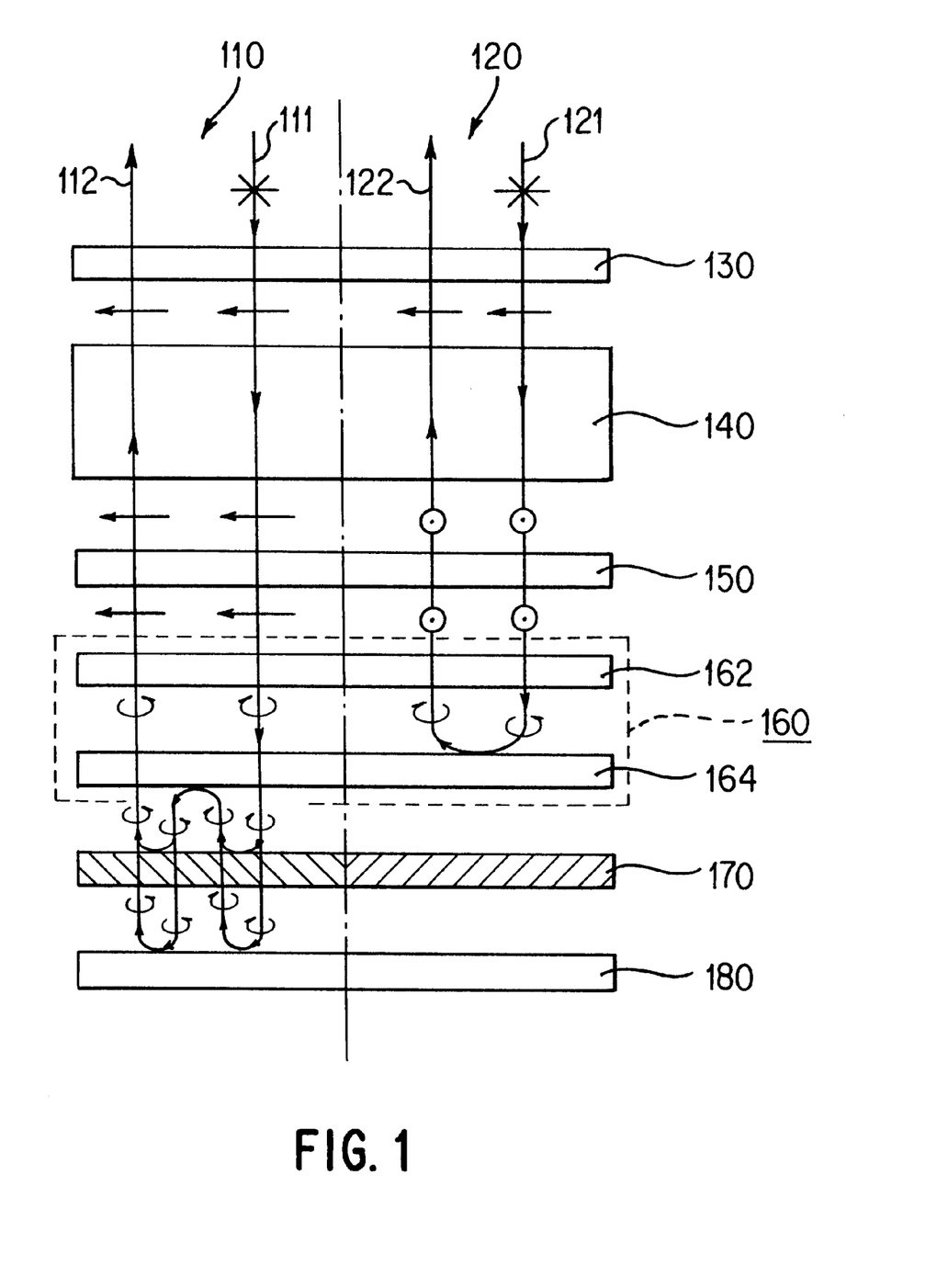
FIG. 1 is a drawing for explaining the principle of a polarized light separator used in the present invention.
Figure 2:
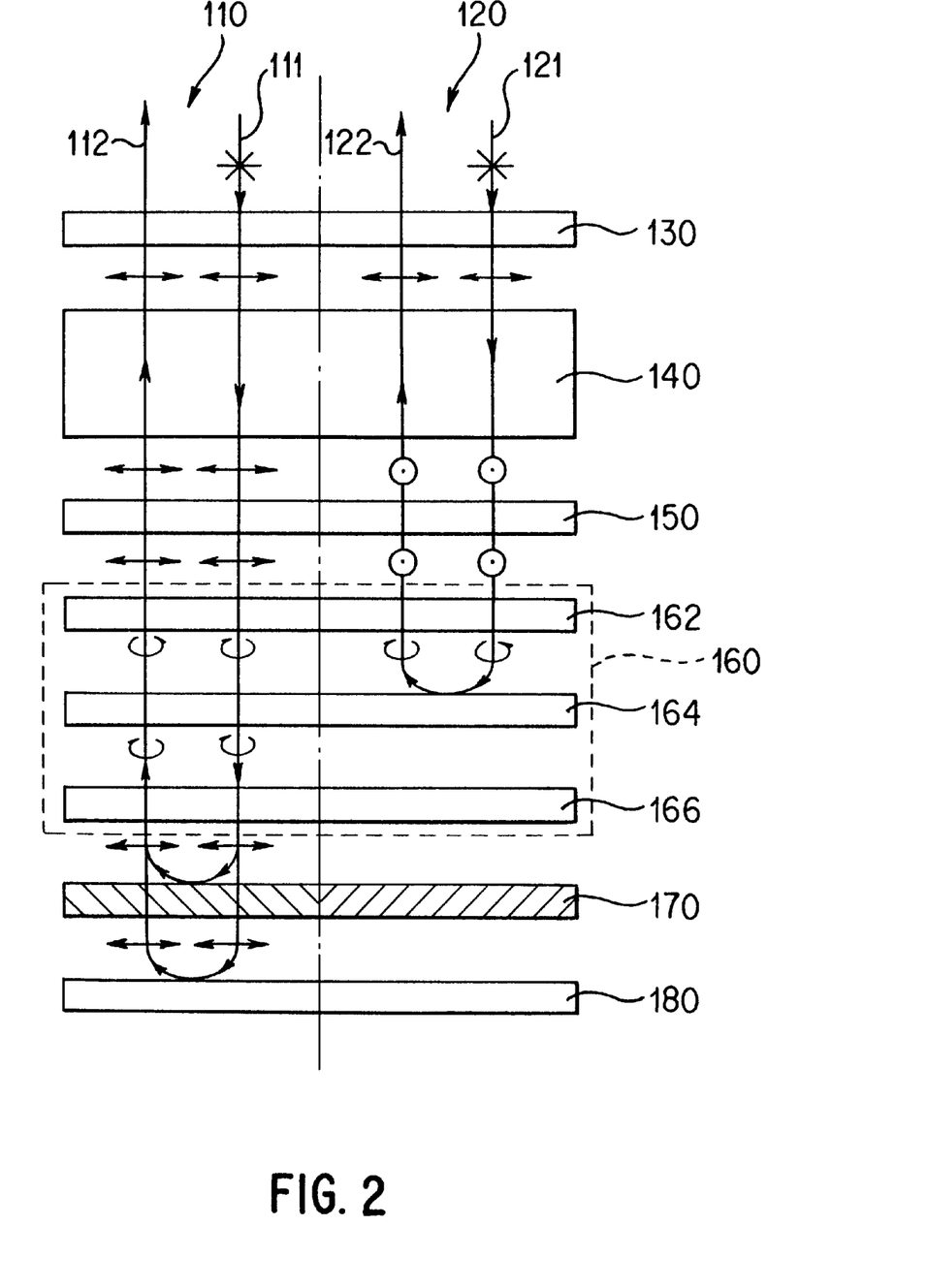
FIG. 2 is a drawing for explaining the principle of a polarized light separator used in the present invention.

FIGS. 1 and 2 are drawings for explaining the principle of a display device according to the present invention. The liquid crystal display devices shown in these drawings are used for explaining the principle of the present invention, and of course, the present invention is not limited to the liquid crystal display devices shown in these drawings.

Referring to FIG. 1, a liquid crystal display device comprises a TN liquid crystal 140 as a transmission polarization axis changing optical element. A polarizer 130 is provided above the TN liquid crystal 140. The polarizer 130 is a polarizer which can emit linearly-polarized light in the predetermined first direction for incident light. A light scattering layer 150, a polarized light separator 160, a colored layer 170 and a reflecting plate 180 are provided under the TN element 140 in this order. In the description below, the left side and the right side of the liquid crystal display device are referred to as a voltage applied portion 110 and a voltage non-applied portion 120, respectively.

The polarized light separator 160 comprises a (¼) λ plate 162 and a cholesteric liquid crystal layer 164. The cholesteric liquid crystal has the property of reflecting circularly polarized light having the same wavelength as the pitch of the liquid crystal and the same rotational direction as the liquid crystal, and transmitting other light. Therefore, for example, when a cholesteric liquid crystal having a pitch of 5000 Å and showing anticlockwise rotation is used for the cholesteric liquid crystal layer 164, an element is obtained in which left-handed circularly-polarized light with a wavelength of 5000 Å is reflected, and right-handed circularly-polarized light and left-handed circularly-polarized light having other wavelengths are transmitted. When a anticlockwise rotation cholesteric liquid crystal is used, and the pitch is changed in the cholesteric liquid crystal over the whole wavelength range of the visible light, an element is obtained in which left-handed circularly-polarized light is reflected for not only monochromatic light but also all while light rays, and right-handed circularly-polarized light is transmitted.

In the polarized light separator 160 comprising a combination of the cholesteric liquid crystal layer 164 and the (¼) λ plate 162, when linearly-polarized light in a predetermined third direction enters from the (¼) λ plate 162 side, the light is changed to left-handed circularly-polarized light by the (¼) λ plate 162, is reflected by the cholesteric liquid crystal layer 164, again changed to linearly-polarized light in a predetermined third direction by the (¼) λ plate 162, and is then emitted. When linearly-polarized light in the second direction perpendicular to the third direction enters, the light is changed to right-handed circularly-polarized light by the (¼) λ plate 162, and transmitted through the cholesteric liquid crystal layer 164. Light incident on the lower side of the cholesteric liquid crystal layer 164 is emitted upward as linearly-polarized light in the second direction from the (¼) λ plate 162.

In this way, the polarized light separator 160 comprising a combination of the cholesteric liquid crystal layer 164 and the (¼) λ plate 162 is polarized light separating means in which, of the light incident on the (¼) λ plate 162 side, the linearly-polarized light component in the predetermined second direction can be transmitted, and the linearly-polarized light component in the third direction perpendicular to the second direction can be reflected, and the light incident on the cholesteric liquid crystal layer 164 side can be emitted as linearly-polarized light in the second direction from the (¼) λ plate 162 side. As the polarized light separating means having such a function, besides the polarized light separator 160 comprising a combination of the cholesteric liquid crystal layer 164 and the (¼) λ plate 162, there are means which employs a multilayer laminated film (U.S. Pat. No. 4,974,219), means for separating polarized light into reflected polarized light and transmitted polarized light by using an angle of polarization (SID 92 DIGEST, pp. 427–429), means which employs a hologram, etc.

Referring to FIG. 1 again, in the voltage non-applied portion 120 on the right side, natural light 121 is changed to linearly-polarized light parallel to the drawing by the polarizer 130, and the polarization direction is then 90° twisted by the TN liquid crystal 140 to make linearly-polarized light perpendicular to the drawing. The linearly-polarized light is then changed to left-handed circularly polarized light by the (¼) λ plate 162, is reflected by the cholesteric liquid crystal layer 164, again enters the (¼) λ plate 162, and is changed to linearly-polarized light perpendicular to the drawing by the (¼) λ plate 162. The polarization direction is then 90° twisted by the TN liquid crystal 140 to form linearly-polarized light parallel to the drawing which is emitted as linearly-polarized light parallel to the drawing from the polarizer 130. Without addition of a voltage, since incident light is reflected by the polarized light separator 160, not absorbed thereby, a bright display is obtained. The light scattering layer 150 provided between the (¼) λ plate 162 and the TN liquid crystal layer 140 changes the light reflected from the polarized light separator 160 from specular light to white light.

In the voltage applied portion 110 on the left side, natural light 111 is changed to linearly-polarized light parallel to the drawing by the polarizer 130, transmitted through the TN liquid crystal 140 without a change in the polarization direction, changed to right-handed circularly polarized light by the (¼) λ plate 162, and then transmitted through the cholesteric liquid crystal layer 164. Part of the right-handed circularly polarized light transmitted through the cholesteric liquid crystal layer 164 is reflected by the colored layer 170, again enters the (¼) λ plate 162, is changed to linearly-polarized light parallel to the drawing by the (¼) λ plate 162, is transmitted through the TN liquid crystal 140 without a change in the polarization direction, and then emitted as linearly-polarized light parallel to the drawing from the polarizer 130. Part of the right-handed circularly polarized light transmitted through the cholesteric liquid crystal layer 164 is transmitted through the colored layer 170 while being absorbed thereby, reflected by the reflecting plate 180, transmitted through the colored layer 170 while being absorbed thereby, reflected by the cholesteric liquid crystal layer 164, reflected by the colored layer 170 while being absorbed thereby, reflected again by the reflecting plate 180, transmitted through the colored layer 170 while being absorbed thereby, transmitted through the cholesteric liquid crystal layer 164 and enters the (¼) λ plate 162. The light is then changed to linearly-polarized light parallel to the drawing by the (¼) λ plate 162, transmitted through the TN liquid crystal 140 without a change in the polarization direction, and then emitted as linearly-polarized light parallel to the drawing from the polarizer 130.

As described above, in the voltage non-applied portion 120, the light reflected from the polarized light separator 160 is scattered by the light scattering layer 150 and emitted as white emitted light 122. In the voltage applied portion 110, the light transmitted through the polarized light separator 160 is colored by the colored layer 170 and emitted as color emitted light 112. As a result, a color display on a white background is obtained. If the colored layer 170 is black, all wavelengths in the visible light region are absorbed to form a black display on a white background. The reflecting plate 180 brightens the color emitted light 112 colored by the colored layer 170.

Referring to FIG. 2, the polarized light separator 160 comprises the (¼) λ plate 162, the cholesteric liquid crystal layer 164, and a (¼) λ plate 166.

In such a polarized light separator 160 comprising the (¼) λ plates 162 and 166 provided on both sides of the cholesteric liquid crystal layer 164, if linearly-polarized light in the predetermined third direction enters from the (¼) λ plate 162 side, the incident light is changed to left-handed circularly polarized light by the (¼) λ plate 162, reflected by the cholesteric liquid crystal layer 164, again made linearly-polarized light in the third direction by the (¼) λ plate 162, and then emitted. If linearly-polarized light in the second direction perpendicular to the third direction enters, the incident light is changed to right-handed circularly polarized light by the (¼) λ plate 162, transmitted through the cholesteric liquid crystal layer 164, again changed to linearly-polarized light in the second direction by the (¼) λ plate 166, and then emitted. For the light incident on the lower side of the (¼) λ plate 166, linearly-polarized light in the second direction is emitted upward from the (¼) λ plate 162.

As described above, the polarized light separator 160 comprising a combination of the cholesteric liquid crystal layer 164 and the (¼) λ plates 162 and 166 is polarized light separating means in which, of the light which enters from the (¼) λ plate 162 side, the linearly-polarized light component in the predetermined second direction can be transmitted as linearly-polarized light in the second direction, and the linearly-polarized light component in the third direction perpendicular to the predetermined second direction is reflected, and the light which enters from the (¼) λ plate 166 side is emitted as linearly-polarized light in the second direction from the (¼) λ plate 162 side. As the polarized separating means having such a function, besides the polarized light separator 160 comprising a combination of the cholesteric liquid crystal layer 164 and the (¼) λ plates 162 and 166, there are means which employs a multilayer laminated film (U.S. Pat. No. 4,974,219), means for separating polarized light into reflected polarized light and transmitted polarized light by using an angle of polarization (SID 92 DIGEST, pp. 427–429), means which employs a hologram, a polarized light separator disclosed as a reflective polarizer in international unexamined application (International Publication No. WO95/17692), etc.

Referring to FIG. 2 again, the function of the voltage non-applied portion 120 on the right side is the same as that of the voltage non-applied portion 120 on the right side of FIG. 1. Namely, natural light 121 is changed to linearly-polarized light parallel to the drawing by the polarizer 130, and the polarization direction is then 90° twisted by the TN liquid crystal 140 to make linearly-polarized light in the direction perpendicular to the drawing. The linearly-polarized light is changed to left-handed circularly polarized light by the (¼) λ plate 162, is reflected by the cholesteric liquid crystal layer 164 and enters again the (¼) λ plate 162. The polarized light is changed to linearly-polarized light in the direction perpendicular to the drawing by the (¼) λ plate 162, and the polarization direction is then 90° twisted by the TN liquid crystal 140 to make linearly-polarized light parallel to the drawing which is emitted from the polarizer 130. In this way, without application of a voltage, incident light is reflected by the polarized light separator 160, not absorbed thereby, to obtain a bright display. Since the light scattering layer 150 is provided between the (¼) λ plate 162 and the TN liquid crystal 140, the light reflected from the polarized light separator 160 is changed from specular light to white light.

In the voltage applied portion 110 on the left side, natural light 111 is changed to linearly-polarized light in the direction parallel to the drawing by the polarizer 130, transmitted through the TN liquid crystal 140 without change in the polarization direction, changed to right-handed circularly polarized light by the (¼) λ plate 162, and transmitted through the cholesteric liquid crystal layer 164. The right-handed circularly polarized light transmitted through the cholesteric liquid crystal layer 164 is changed to linearly-polarized light parallel to the drawing by the (¼) λ plate 166. Part of the linearly-polarized light is reflected by the colored layer 170, transmitted again through the (¼) λ plate 166, the cholesteric liquid crystal layer 164 and the (¼) λ plate 162, transmitted as linearly-polarized light parallel to the drawing through the TN liquid crystal 140 without change in the polarization direction, and then emitted as linearly-polarized light parallel to the drawing from the polarizer 130. Part of the linearly-polarized light emitted from the (¼) λ plate 166 is transmitted through the colored layer 170 while being absorbed thereby, reflected by the reflecting plate 180, again transmitted through the colored layer 170 while being absorbed thereby, again transmitted through the (¼) λ plate 166, the cholesteric liquid crystal layer 164 and the (¼) λ plate 162, transmitted as linearly-polarized light parallel to the drawing through the TN liquid crystal 140 without change in the polarization direction, and then emitted as linearly-polarized light parallel to the drawing from the polarizer 130.

As described above, in the voltage non-applied portion 120, the light reflected by the polarized light separator 160 is scattered by the light scattering layer 150 to emit white emitted light 122. In the voltage applied portion 110, the light transmitted through the polarized light separator 160 is colored by the colored layer 170 to emit color emitted light 112. As a result, a color display on a white ground is obtained. If the colored layer 170 is black, all wavelengths in the visible light range are absorbed to obtain a black display on a white ground. Since the reflecting plate 180 is provided, the color emitted light 112 colored by the colored layer 170 is brightened.

Although the TN liquid crystal 140 is described above as an example, if another liquid crystal in which the transmission polarization axis can be changed by a voltage, such as a STN liquid crystal, ECB (Electrically Controlled Birefringence) liquid crystal or the like, is used in place of the TN liquid crystal 140, the basic principle of operation is the same.

The principle of the present invention in a case using another polarized light separator will be described below with reference to FIGS. 3 and 4.

Figure 3:
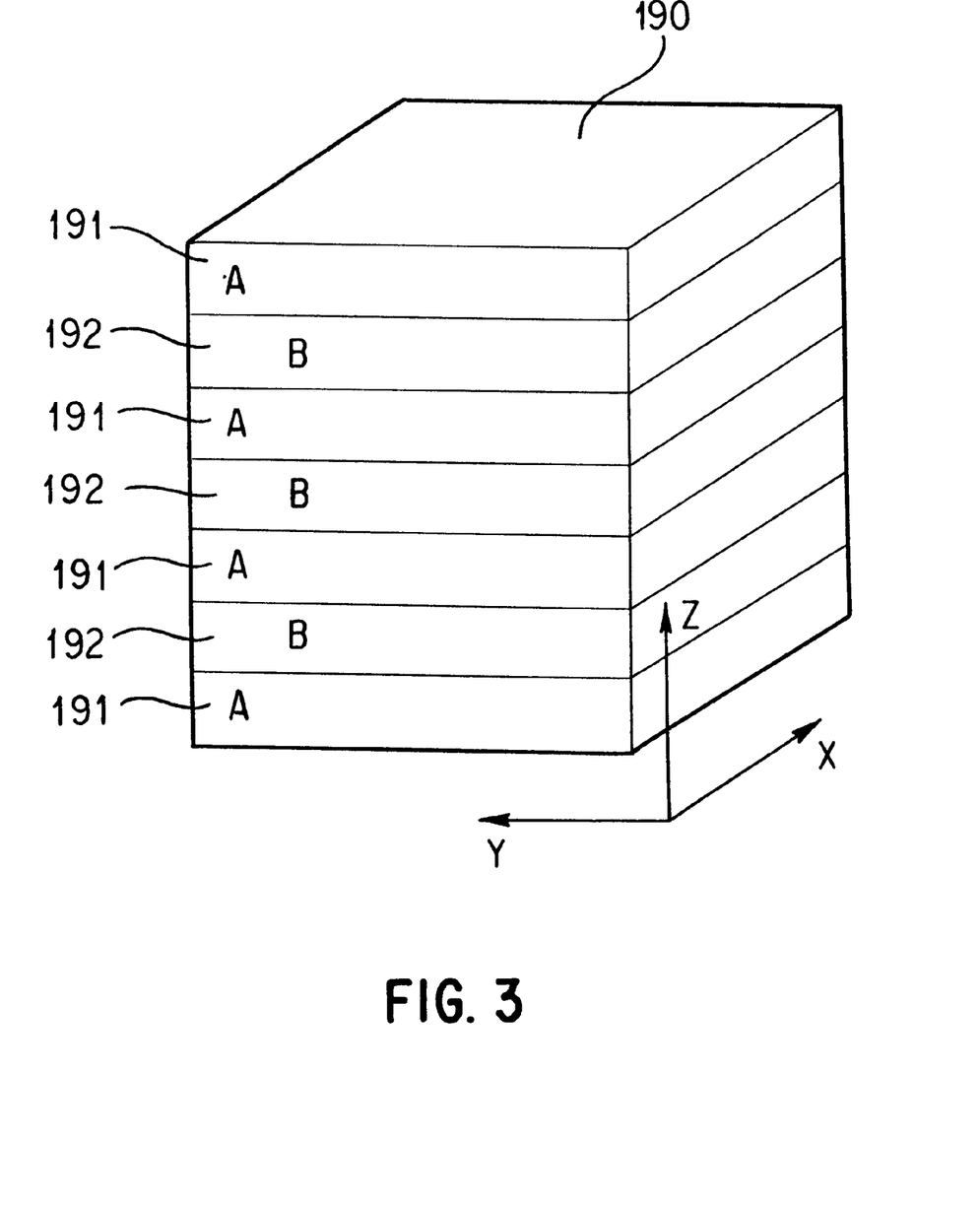
FIG. 3 is an enlarged sectional view of a polarized light separator used in the present invention.
Figure 4:
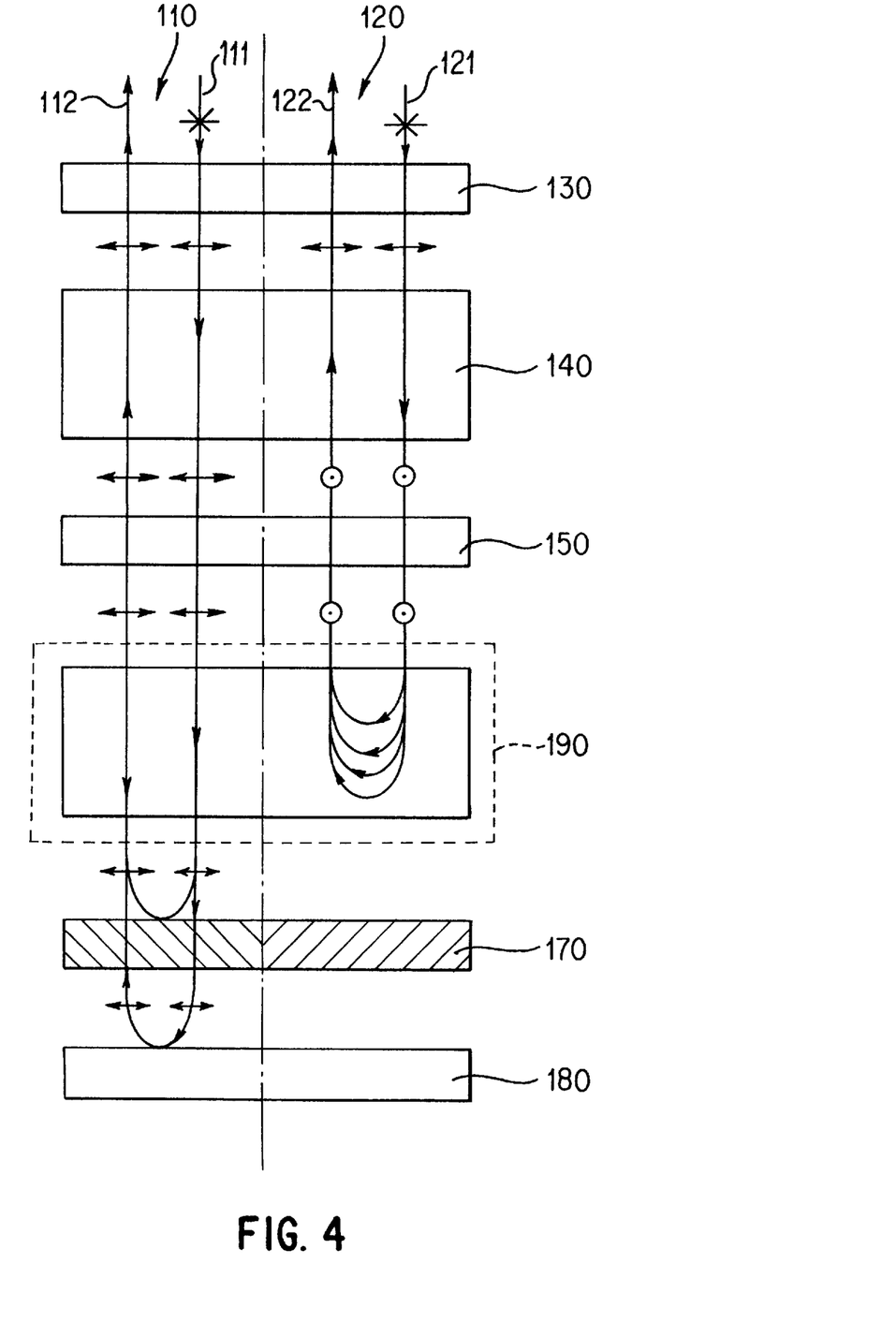
FIG. 4 is a drawing for explaining the principle of a polarized light separator used in the present invention.

FIG. 3 is an enlarged perspective view of a polarized light separator used in the present invention, and FIG. 4 is a drawing for explaining the principle of a display device of the present invention. The liquid crystal display device shown in these drawings is used for explaining the principle of the present invention. Of course, the present invention is not limited to the liquid crystal display device shown in the drawings.

Referring to FIG. 4, a liquid crystal display device comprises a TN liquid crystal 140 serving as a transmission polarization axis changing optical element. A polarizer 130 is provided above the TN liquid crystal 140. A light scattering layer 150, a polarized light separator 190, a colored layer 170 and a reflecting plate 180 are provided under the TN liquid crystal 140 in this order. The left side of the liquid crystal display device is referred to as "the voltage non-applied portion 110", and the right side thereof is referred to as "the voltage applied portion 120".

The polarized light separator 190 has a structure in which two different layers 191 (A layer) and 192 (B layer) are alternately laminated, as shown in FIG. 3. The A layer 191 has different refractive indexes ($n_{AX}$) and ($n_{AY}$) in the X axis direction and Y axis direction, respectively. The B layer 192 has the same refractive index ($n_{BX}$) and ($n_{BY}$) in the X axis direction and Y axis direction. The refractive index ($n_{AY}$) in the Y axis direction of the A layer 191 is equal to the refractive index ($n_{BY}$) in the Y axis direction of the B layer 190.

Therefore, of the light which enters the polarized light separator 190, the linearly-polarized light in the Y axis direction is passed through the polarized light separator, and emitted as linearly-polarized light in the Y axis direction.

On the other hand, if the thickness of the A layer 191 in the Z axis direction is tA, the thickness of the B layer 52 in the Z axis direction is tB, and the wavelength of incident light is λ, the A and B layers are formed so that the following equation is established:

$$t_A \cdot n_{AX} + t_B \cdot n_{BX} = \lambda/2 \quad (1)$$

As a result, of the light with wavelength λ which enters the polarized light separator 190, linearly-polarized light in the X axis direction is reflected as linearly-polarized light in the X axis direction by the polarized light separator 190.

When the thickness $t_A$ of the A layer 191 in the Z axis direction and the thickness $t_B$ of the B layer 192 in the Z axis direction are changed to various values so that the above equation (1) is established over the whole wavelength range of visible light, for not only monochromic light but also whole white light rays, a polarized light separator is obtained in which linearly-polarized light in the X axis direction is reflected as linearly-polarized light in the X axis direction, and linearly-polarized light in the Y axis direction is transmitted as linearly-polarized light in the Y axis direction.

Such a polarized light separator is disclosed as a reflective polarizer in International Unexamined Publication (WO95/17692).

In the polarized light separator 190 in which layers having different refractive indexes in the X axis direction are alternately laminated, when linearly-polarized light in a predetermined third direction (X axis direction) enters from the TN liquid crystal 140 side, the light is reflected by the polarized light separator 190, and emitted as linearly-polarized light in the predetermined third direction. When linearly-polarized light in a predetermined second direction (Y axis direction) perpendicular to the predetermined third direction enters, the light is transmitted through the polarized light separator 190, and emitted as linearly-polarized light in the predetermined second direction. The light which enters from the reflecting plate 180 side is emitted as linearly-polarized light in the predetermined second direction to the TN liquid crystal 140.

Referring to FIG. 4, natural light 121 is changed to linearly-polarized light parallel to the drawing by the polarizer 130, and the polarization direction is then 90° twisted by the TN liquid crystal 140 to make linearly-polarized light perpendicular to the drawing which is then reflected by the polarized light separator 190. The polarization direction is 90° twisted again by the TN liquid crystal 140 to change the linearly-polarized light perpendicular to the drawing to linearly-polarized light parallel to the drawing which is then emitted as linearly-polarized light parallel to the drawing from the polarizer 130. In this way, without application of a voltage, incident light is reflected by the polarized light separator 190, not absorbed thereby, to obtain a bright display. Since the light scattering layer is provided between the polarized light separator 190 and the TN liquid crystal 140, the light reflected from the polarized light separator 190 is changed from specular light to white light.

In the voltage applied portion 110 on the left side, natural light 111 is changed to linearly-polarized light parallel to the drawing by the polarizer 130, and then transmitted through the TN liquid crystal 140 and the polarized light separator 190 without change in the polarization direction. Part of the linearly-polarized light is reflected by the colored layer 170, again transmitted through the polarized light separator 190, transmitted as linearly-polarized light parallel to the drawing through the TN liquid crystal 140 without a change in the polarization direction, and emitted as linearly-polarized light parallel to the drawing from the polarizer 130. Part of the linear polarized light emitted from the polarized light separator 190 is transmitted through the colored layer 170 while being absorbed thereby, reflected by the reflecting plate 180, again transmitted through the colored layer 170 while being absorbed thereby, again transmitted through the polarized light separator 190, transmitted as linear polarized light parallel to the drawing through the TN liquid crystal 140 without a change in the polarization direction, and then emitted as linearly-polarized light parallel to the drawing from the polarizer 130.

As described above, in the voltage non-applied portion 120, the light reflected by the polarized light separator 190 is scattered by the light scattering layer 150 to emit white emitted light 122. In the voltage applied portion 110, the light transmitted through the polarized light separator 190 is colored by the colored layer 170 to emit color emitted light 112. As a result, a color display on a white background is obtained. If the colored layer 170 is black, all wavelengths in the visible light region are absorbed to obtain a black display on a white background. Since the reflecting plate 180 is provided, the color emitted light 112 colored by the colored layer 170 is brightened.

Although the above description relates to the TN liquid crystal 140 as an example, the use of another liquid crystal in which the transmission polarization axis can be changed by a voltage, such as a STN liquid crystal, ECB (Electrically Controlled Birefringence) liquid crystal, or the like, in place of the TN liquid crystal 140 has the same basic principle of operation.

The present invention has been achieved on the basis of the above principles. In accordance with the present invention, there is provided a display device comprising:

transmission polarization axis changing means for changing a transmission polarization axis;

first and second polarized light separating means disposed on both sides of the transmission polarization axis changing means holding the transmission polarization axis changing means therebetween; and a substrate disposed on an opposite side of the second polarized light separating means with respect to the transmission polarization axis changing means;

wherein the first polarized light separating means has first and second sides and emits light incident on the first side as linearly-polarized light in a predetermined first direction from the second side, and emits light incident on the second side as linearly-polarized light in the predetermined first direction from the first side; and the second polarized light separating means has first and second sides, the first side facing the substrate, the second side facing the transmission polarization axis changing means, a linearly-polarized light component in a predetermined second direction of light incident on the second side is transmitted to the first side, a linearly-polarized light component in a predetermined third direction perpendicular to the predetermined second direction of light incident on the second side is reflected to the second side, and the light incident on the first side is emitted to the transmission polarization axis changing means as linearly-polarized light in the predetermined second direction.

In the display device of the present invention, two display states including a first display state caused by the light reflected from the second polarized light separating means and a second display state caused by the light transmitted through the second polarized light separating means are obtained according to the state of the transmission polarization axis of the transmission polarization axis changing means. The first display state is caused by the light reflected from the second polarized light separating means, and thus creates bright a display.

In the display device of the present invention, since the second polarized light separating means is provided nearer the transmission polarization axis changing means than the substrate, it is possible to prevent doubled display, i.e., parallax, from occurring due to the thickness of the substrate.

The second polarized light separating means preferably transmits a linearly-polarized light component in the predetermined second direction of light incident on the second side to the first side, over the whole wavelength range in the visible light region, and reflects a linearly-polarized light component in the predetermined third direction to the second side, and emits a linearly-polarized light component in the predetermined second direction of light incident on the first side to the transmission polarization axis changing means.

This creates the above first and second display states for light over the substantially whole wavelength range in the visible light region. In the first display state, transparent reflection or white reflection is obtained, and in the second display state, a display which employs light over the substantially whole wavelength range in the visible light region is obtained.

The second polarized light separating means preferably transmits a linearly-polarized light component in the predetermined second direction of light incident on the second side as linearly-polarized light in the predetermined second direction to the first side.

The second polarized light separating means preferably comprises a laminate having a plurality of layers wherein the respective adjacent layers have a same refractive index in the predetermined second direction and different refractive indexes in the predetermined third direction.

As the transmission polarization axis changing means, a liquid crystal element is preferably used, and a TN liquid crystal element, a STN liquid crystal element or an EBC liquid crystal element is more preferably used. The STN liquid crystal element includes an STN liquid crystal element using color compensation optical anisotropic material.

The first polarized light separating means preferably serves as a polarizer.

The display device of the present invention preferably further comprises an optical element which is disposed on an opposite side of the second polarized light separating means with respect to the transmission polarization axis changing means and which emits light from as light in a predetermined wavelength region to the second polarized light separating means.

In the second display state, this creates a display with the light in the predetermined wavelength region which is emitted from the optical element and transmitted through the second polarized light separating means.

The optical element is preferably an optical element that absorbs light from the second polarized light separating means in a wavelength region other than the predetermined wavelength region, reflects light in the predetermined wavelength region to the second polarized light separating means, and transmits light in the predetermined wavelength region. The optical element more preferably comprises a color filter.

An optical element that emits light from the second polarized light separating means in the predetermined wavelength region may be used. In this case, the optical element preferably comprises a fluorescent material.

As the optical element, a hologram that emits light in the predetermined wavelength region using the light from the second polarized light separating means can also be used.

A second optical element which absorbs light over a substantially whole wavelength range in the visible light region can further be provided on an opposite side of the second polarized light separating means with respect to the transmission polarization axis changing means. This can cause a black display.

Reflecting means is preferably further provided on an opposite side of the second polarized light separating means with respect to the transmission polarization axis changing means. This brightens the second display state.

When the display device comprises the optical element, reflecting means is preferably further provided on an opposite side of the optical element with respect to the second polarized light separating means so that light in the predetermined wavelength region is reflected by the reflecting means to the optical element. This brightens the second display state caused by the light from the optical element.

The substrate is preferably a glass substrate. A plastic film substrate can also be used as the substrate.

First and second electrodes are preferably further provided on both sides of the transmission polarization axis changing means. The first and second electrodes are preferably used for giving the transmission polarization axis changing means a signal for changing the transmission polarization axis.

In this case, the first electrode is preferably a transparent electrode disposed on a same side as the first polarized light separating means with respect to the transmission polarization axis changing means, and the second electrode is preferably a reflector disposed between the second polarized light separating means and the substrate.

Therefore, since the reflection electrode is formed inward of the substrate, it is possible to prevent the occurrence of parallax due to the thickness of the substrate.

Preferably, the first electrode is a transparent electrode disposed on a same side of the first polarized light separating means with respect to the transmission polarization axis changing means, the second electrode is a transparent electrode disposed between the second polarized light separating means and the substrate, and reflection means is further provided an opposite side of the second electrode with respect to the second polarized light separating means.

Preferably, the first electrode is a transparent electrode disposed on a same side of the first polarized light separating means with respect to the transmission polarization axis changing means, the second electrode is a transparent electrode disposed between the transmission polarization axis changing means and the second polarized light separating means, and reflection means is further provided on an opposite side of the second polarized light separating means with respect to the transparent electrode.

Therefore, since the second electrode is disposed between the transmission polarization axis changing means and the second polarized light separating means, it is possible to decrease the distance to the first electrode to decrease the driving voltage of the transmission polarization axis changing means, and improve a sharpness of transition properties between the first display state and the second display state.

The reflection means is provided on an opposite side of the substrate with respect to the second polarized light separating means. This causes the reflection means to be provided outside the substrate, and thus facilitates provision of the reflection means.

The second electrode preferably comprises a plurality of sub-electrodes which are disposed in a matrix and to each of which a switching element is electrically connected. As the switching element, an active element such as TFT, MIM or the like is preferably used.

Preferably, a plurality of third optical elements are further provided on an opposite side of the second polarized light separating means with respect to the transmission polarization axis changing means in correspondence with respective display dots so that each of the plurality of optical elements emit light from the light from the second polarized light separating means in the predetermined wavelength region to the second polarized light separating means. The third optical elements are preferably color filters. As described above, in the present invention, since the second polarized light separating means is provided inward of the substrate, parallax can be prevented. As a result, even if the third optical element comprising a color filter is provided for each display dot, a high-definition color display can be obtained.

Light scattering means is preferably further provided. This makes white the first display state caused by the light reflected from the second polarized light separating means.

In accordance with the present invention, there is provided an electronic apparatus including a display device comprising transmission polarization axis changing means for changing a transmission polarization axis, first and second polarized light separating means disposed on both sides of the transmission polarization axis changing means holding the transmission polarization axis changing means therebetween, a substrate disposed on an opposite side of the second polarized light separating means with respect to the transmission polarization changing means, wherein the first polarized light separating means has first and second sides and emits light incident on the first side as linearly-polarized light in a predetermined first direction from the second side, and emits light incident on the second side as linearly-polarized light in the predetermined first direction from the first side, and the second polarized light separating means has first and second sides, the first side facing the substrate, the second side facing the transmission polarization axis changing means, a linearly-polarized light component in a predetermined second direction of light incident on the second side is transmitted to the first side, and a linearly-polarized light component in a predetermined third direction perpendicular to the predetermined second direction of light incident on the second side is reflected to the second side, and light incident on the first side is emitted to the transmission polarization axis changing means as linearly-polarized light in the predetermined second direction.

BRIEF DESCRIPTION OF THE DRAWINGS

FIGS. 5A and 5B are drawings illustrating a liquid crystal display device in accordance with a first embodiment of the present invention, in which

DETAILED DESCRIPTION OF PREFERRED EMBODIMENTS

An embodiment of the present invention will be described below with reference to the drawings.

Figure 5A:
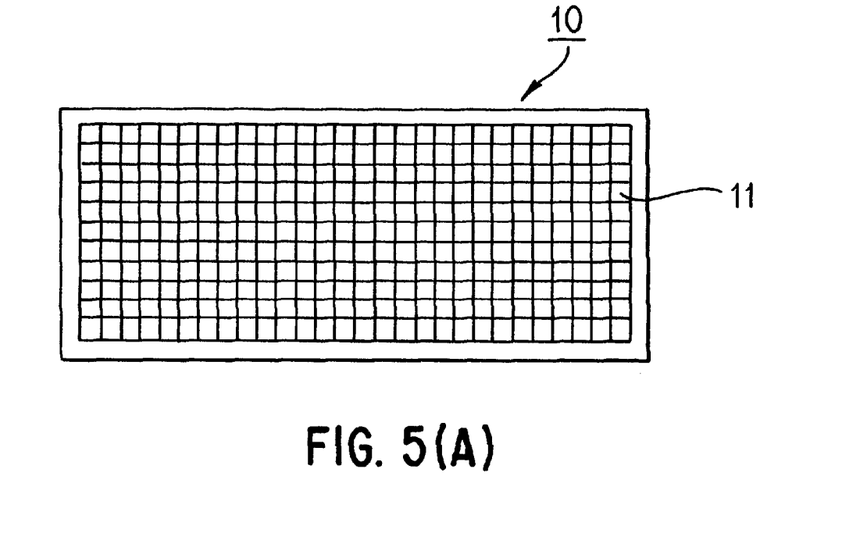
FIG. 5A is a plan view.
Figure 5B:
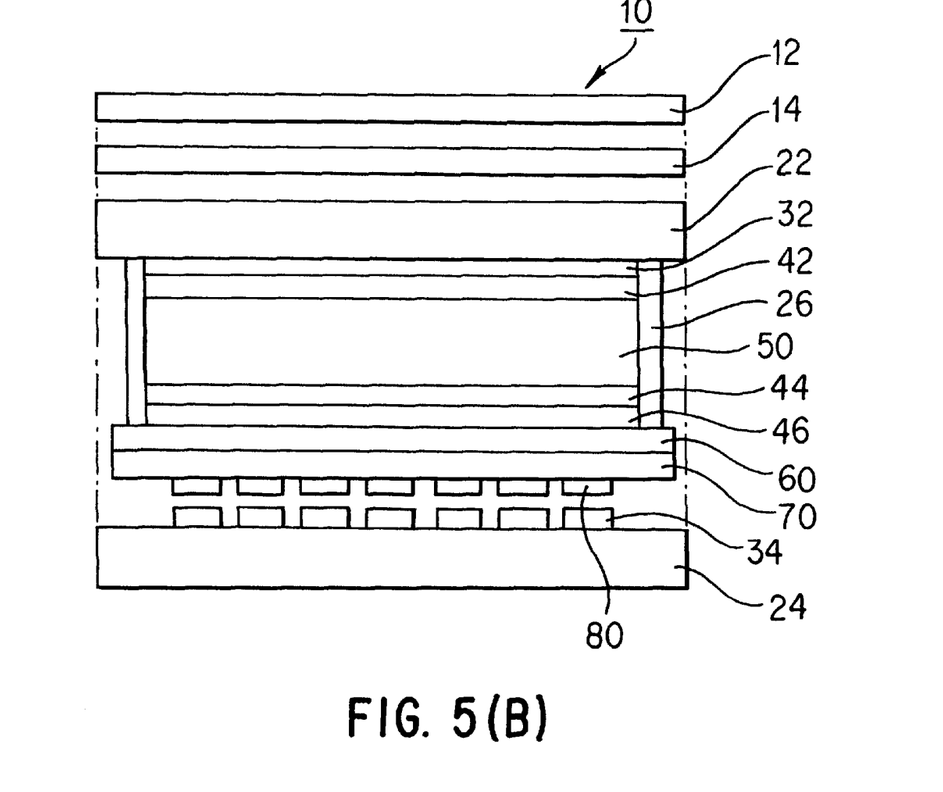
FIG. 5B is an exploded sectional view.

FIGS. 5A and 5B are drawings illustrating a liquid crystal display device in accordance with a first embodiment of the present invention. FIG. 5A is a plan view, and FIG. 5B is an exploded sectional view.

A liquid crystal display device 10 of this embodiment is a reflection type liquid crystal color display device having pixels separated in a dot matrix and having different color filters. In the liquid crystal display device 10, a transmission polarization axis changing optical element comprises a STN liquid crystal 50. The STN liquid crystal 50 is sealed in the cell formed by two glass substrates 22 and 24 and a sealing member 26. A phase difference film 14 and a polarizer 12 are provided above the glass substrate 22 in this order. The phase difference film 14 is used as a color compensation optical anisotropic material for compensating for coloring caused in the STN liquid crystal 50. Under the glass substrate 22 are provided a transparent electrode 32 and an oriented film 42 in this order. On the glass substrate 24 are a plurality of aluminum electrodes 34 each serving as a pixel electrode.

A polarized light separator 70 is provided above the glass substrate 24. As the polarized light separator 70 in this embodiment, the polarized separator described above with reference to FIGS. 3 and 4, i.e., the polarized separator disclosed as a reflective polarizer in International Unexamined Publication (WO95/17692), is used.

As the polarized light separator having the above function, there are a polarized light separator comprising a cholesteric liquid crystal layer held between two (¼) λ plates, means which employs a multilayer laminated film, means for separating polarized light into reflected polarized light and transmitted polarized light by using an angle of polarization, means which employs hologram, and the polarized light separator disclosed as a reflective polarizer in International Unexamined Application (International Publication No. WO95/17692). In this embodiment, the polarized light separator disclosed as a reflective polarizer in International Unexamined Application (International Publication No. WO95/17692) is used.

In this embodiment, as the polarized separator 70, the polarized separator described above with reference to FIG. 1, i.e., a polarized separator in which of the light incident on the STN cell 20 side, the linearly-polarized light component in the predetermined second direction is transmitted, and the linearly-polarized light component in the third direction perpendicular to the predetermined second direction is reflected, and the light incident on the color filter 50 side is emitted as linearly-polarized light in the second direction to the STN cell 20 side, can also be used. The polarized separator described above with reference to FIG. 2, i.e., a polarized separator in which, of the light incident on the STN liquid crystal 50 side, the linearly-polarized light component in the predetermined second direction is transmitted as linearly-polarized light in the second direction, and the linearly-polarized light component in the third direction perpendicular to the predetermined second direction is reflected, and the light incident on the aluminum electrode 34 side can be emitted as linearly-polarized light in the second direction to the STN liquid crystal 50 side, may be used.

On the lower side of the polarized light separator 70 are provided color filters 80 respectively corresponding to the aluminum electrodes 34 in such a manner that three pixels including R, G and B form one dot 11. As a result, a full color display comprising R, G and B colors can be obtained. The three pixels including cyan, magenta and yellow may be provided to form full color.

On the polarized light separator 70 are provided a diffusion layer 60, an overcoat layer 46 and an oriented film 44 in this order. The overcoat layer is used for flattening.

The operation of the liquid crystal display device 10 of this embodiment will be described.

In a voltage non-applied region, natural light is changed to linearly-polarized light in a predetermined direction by the polarizer 12, and the polarization direction is then twisted for a predetermined angle by the STN liquid crystal 50 to make linearly-polarized light which is then reflected by the polarized light separator 70, not absorbed thereby. The polarization direction is twisted for the predetermined angle by the STN liquid crystal 50 to emit linearly-polarized light from the polarizer 12. In this way, without application of a voltage, polarized light is reflected by the polarized light separator 70, not absorbed thereby, thereby obtaining a bright display. Since the diffusion layer 60 is provided between the STN liquid crystal 50 and the polarized light separator 70, the light reflected from the polarized light separator 70 is changed from specular light to white light.

In a voltage applied region, natural light is changed to linearly-polarized light in the predetermined direction by the polarizer 12, transmitted as linearly-polarized light through the STN liquid crystal 50 and the diffusion layer 60, and then transmitted as linearly-polarized light through the polarized light separator 70. Part of the transmitted linearly-polarized light is colored and reflected by the color filters 80, transmitted through the polarized light separator 70, the diffusion layer 60, the STN liquid crystal 50 and the polarizer 12 and emitted as linearly-polarized light. Another part of the linearly-polarized light transmitted through the polarized light separator 70 is transmitted as linearly-polarized light through the color filters 80 while being absorbed thereby, reflected by the aluminum electrodes 34, again transmitted through the color filters 80 while being absorbed thereby, transmitted through the polarized light separator 70, the diffusion layer 60, the STN liquid crystal 50 and the polarizer 12, and then emitted as linearly-polarized light.

In this way, in the voltage non-applied region, the light reflected by the polarized light separator 70 is scattered by the diffusion layer 60 and emitted as white linearly-polarized light. In the voltage applied region, the light transmitted through the polarized light separator 70 is colored by the color filters 80 and emitted as color linearly-polarized light. As a result, a color display on a white background can be obtained. If the color filters 80 have black portions, since all wavelengths in the visible light region are absorbed in the black portions, a partially black display is obtained. Further, since the aluminum electrodes 34 are provided, the aluminum electrodes 34 function as reflection means for brightening the color display formed by the color filters.

Since the polarized light separator 70, the color filters 80 and the aluminum electrodes 4 are provided inward of the glass substrate 24, occurrence of parallax can be prevented.

Figure 6:
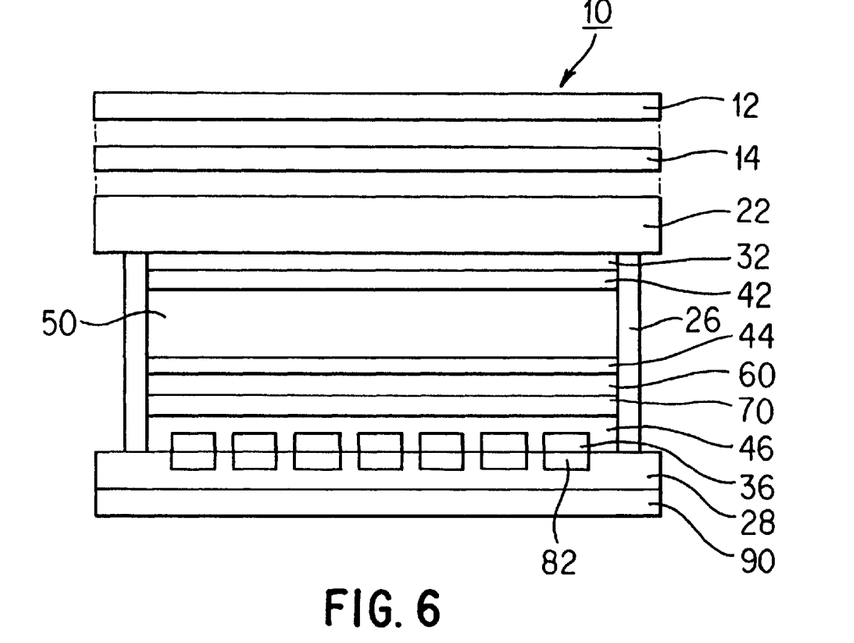
FIG. 6 is an exploded sectional view illustrating a liquid crystal display device in accordance with a second embodiment of the present invention.

FIG. 6 is an exploded sectional view illustrating a liquid crystal display device in accordance with a second embodiment of the present invention.

A liquid crystal display device 10 of this embodiment is a reflection type liquid crystal color display device comprising pixels separated in a dot matrix and respectively having different color filters. In the liquid crystal display device 10, a transmission polarization axis changing optical element comprises a STN liquid crystal 50. The STN liquid crystal 50 is sealed in a cell formed by a glass substrate 22, a PET (polyethylene terephthalate) plastic film substrate 28 and a sealing member 26. A phase difference film 14 and a polarizer 12 are provided above the glass substrate 22 in this order. The phase difference film 14 is used as a color compensation optical anisotropic material for compensating for coloring which occurs in the STN liquid crystal 50. On the lower side of the glass substrate 22 are provided a transparent electrode 32 and an oriented film 42 in this order.

The plastic film substrate 28 is selectively colored a plurality of colors to form color filters 82. Transparent electrodes 36 comprising ITO (Indium Tin Oxide) or tin oxide are provided on the plastic film substrate corresponding to the color filters 82. Each of the transparent electrodes 36 serves as a pixel electrode. The three pixels including red (R), green (G) and blue (B) or cyan (C), magenta (M) and yellow (Y) form each dot.

On the plastic film substrate 28 and the transparent electrodes 36 is provided an overcoat layer 46 for flattening.

On the overcoat layer 46 are provided a polarized light separator 70, a diffusion layer 60 and an oriented film 44 in this order. In this embodiment, as the polarized light separator 70, the polarized light separator disclosed in International Unexamined Application (International Publication No. WO95/17692) is used.

The operation of the liquid crystal display device 10 of this embodiment will be described.

In a voltage non-applied region, natural light is changed to linearly-polarized light in a predetermined direction by the polarizer 12, and the polarization direction is then twisted for a predetermined angle by the STN liquid crystal 50 to make linearly-polarized light which is then reflected by the polarized light separator 70, not absorbed thereby. The polarization direction is twisted for the predetermined angle by the STN liquid crystal 50 to emit linearly-polarized light from the polarizer 12. In this way, without application of a voltage, polarized light is reflected by the polarized light separator 70, not absorbed thereby, thereby obtaining a bright display. Since the diffusion layer 60 is provided between the STN liquid crystal 50 and the polarized light separator 70, the light reflected from the polarized light separator 70 is changed from specular light to white light.

In a voltage applied region, natural light is changed to linearly-polarized light in the predetermined direction by the polarizer 12, transmitted as linearly-polarized light through the STN liquid crystal 50 and the diffusion layer 60, and then transmitted as linearly-polarized light through the polarized light separator 70. Part of the transmitted linearly-polarized light is colored and reflected by the color filters 82, transmitted through the polarized light separator 70, the diffusion layer 60, the STN liquid crystal 50 and the polarizer 12 and emitted as linearly-polarized light. Another part of the linearly-polarized light transmitted through the polarized light separator 70 is transmitted as linearly-polarized light through the color filters 82 while being absorbed thereby, reflected by a reflecting plate 90, again transmitted through the color filters 82 while being absorbed thereby, transmitted through the polarized light separator 70, the diffusion layer 60, the STN liquid crystal 50 and the polarizer 12, and then emitted as linearly-polarized light.

In this way, in the voltage non-applied region, the light reflected by the polarized light separator 70 is scattered by the diffusion layer 60 and emitted as white linearly-polarized light. In the voltage applied region, the light transmitted through the polarized light separator 70 is colored by the color filters 82 and emitted as color linearly-polarized light. As a result, a color display on a white background can be obtained. If the color filters 82 have black portions, since all wavelengths in the visible light region are absorbed in the black portions, a partially black display is obtained. Further, since the reflecting plate 90 is provided, the color display formed by the color filters 82 is brightened.

Since the polarized light separator 70, the color filters 82 and the transparent electrodes 36 are provided inward of the plastic film substrate 28, occurrence of parallax can be prevented. Unlike the use of a glass substrate, the use of the plastic film substrate 28 as in this embodiment can decrease the thickness of the substrate and can thus prevent the occurrence of parallax.

Figure 7:
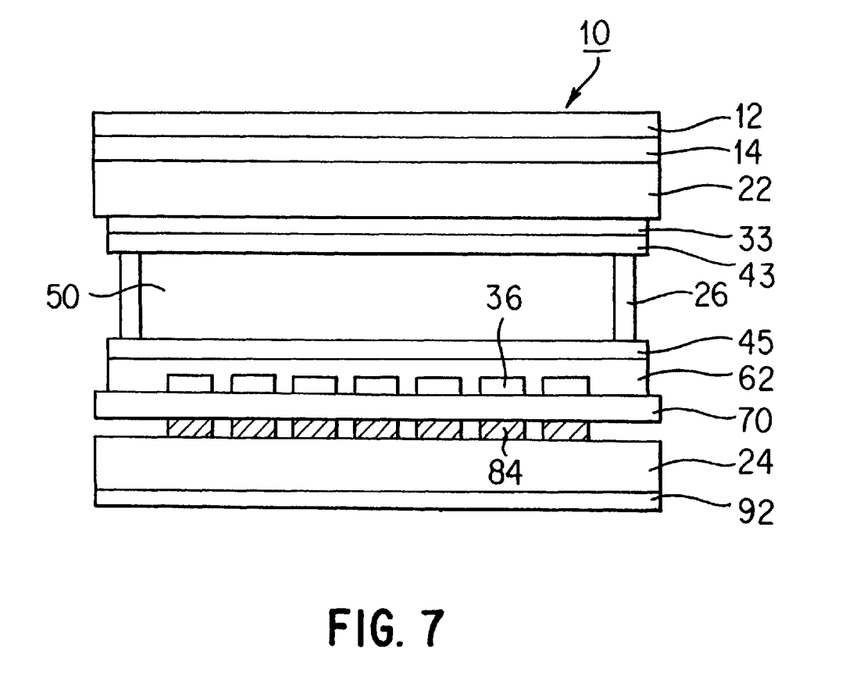
FIG. 7 is an exploded sectional view illustrating a liquid crystal display device in accordance with a third embodiment of the present invention.

FIG. 7 is an exploded sectional view illustrating a liquid crystal display device in accordance with a third embodiment of the present invention.

A liquid crystal display device 10 of this embodiment is a reflection type liquid crystal color display device comprising pixels separated in a dot matrix and respectively having different color filters. In the liquid crystal display device 10, a transmission polarization axis changing optical element comprises a STN liquid crystal 50. The STN liquid crystal 50 is sealed in a cell formed by glass substrates 22 and 24 and a sealing member 26. A phase difference film 14 and a polarizer 12 are provided above the glass substrate 22 in this order. The phase difference film 14 is used as a color compensation optical anisotropic material for compensating for coloring which occurs in the STN liquid crystal 50. On the lower side of the glass substrate 22 are provided a transparent electrode 33 and an oriented film 43 in this order.

On the lower side of the glass substrate 24 is formed a reflecting plate 92. On the glass substrate 24 are formed color filters 84. On the color filters 84 is provided a polarized light separator 70. In this embodiment, as the polarized light separator 70, the polarized light separator disclosed as a reflective polarizer in International Unexamined Application (International Publication No. WO95/17692) is used. On the polarized light separator 70 are provided transparent electrodes 36 comprising ITO or tin oxide corresponding to the color filters 84, each of the transparent electrodes 36 serving as a pixel electrode. Three pixels including R, G and B form each dot.

On the polarized light separator 70 and the transparent electrodes 36 is provided a diffusion layer 62 on which an oriented film 45 is provided. In this embodiment, the diffusion layer 62 is also used for flattening.

The operation of the liquid crystal display device 10 of this embodiment will be described.

In a voltage non-applied region, natural light is changed to linearly-polarized light in a predetermined direction by the polarizer 12, and the polarization direction is then twisted for a predetermined angle by the STN liquid crystal 50 to make linearly-polarized light which is then reflected by the polarized light separator 70, not absorbed thereby. The polarization direction is twisted for the predetermined angle by the STN liquid crystal 50 to emit linearly-polarized light from the polarizer 12. In this way, without application of a voltage, polarized light is reflected by the polarized light separator 70, not absorbed thereby, thereby obtaining a bright display. Since the diffusion layer 62 is provided between the STN liquid crystal 50 and the polarized light separator 70, the light reflected from the polarized light separator 70 is changed from specular light to white light.

In a voltage applied region, natural light is changed to linearly-polarized light in the predetermined direction by the polarizer 12, transmitted as linearly-polarized light through the STN liquid crystal 50 and the diffusion layer 62 without a change in the polarization direction, and then transmitted as linearly-polarized light through the polarized light separator 70 without a change in the polarization direction. Part of the transmitted linearly-polarized light is colored and reflected by the color filters 84, transmitted through the polarized light separator 70, the diffusion layer 62, the STN liquid crystal 50 and the polarizer 12 without a change in the polarization direction and emitted as linearly-polarized light. Another part of the linearly-polarized light transmitted through the polarized light separator 70 is transmitted as linearly-polarized light through the color filters 84 while being absorbed thereby without a change in the polarization direction, reflected by the reflecting plate 92, again transmitted through the color filters 84 while being absorbed thereby, transmitted through the polarized light separator 70, the diffusion layer 62, the STN liquid crystal 50 and the polarizer 12 without a change in the polarization direction, and then emitted as linearly-polarized light.

In this way, in the voltage non-applied region, the light reflected by the polarized light separator 70 is scattered by the diffusion layer 62 and emitted as white linearly-polarized light. In the voltage applied region, the light transmitted through the polarized light separator 70 is colored by the color filters 84 and emitted as color linearly-polarized light. As a result, a color display on a white background can be obtained. If the color filters 84 have black portions, since all wavelengths in the visible light region are absorbed in the black portions, a partially black display is obtained. Further, since the reflecting plate 92 is provided, the color display formed by the color filters 82 is brightened.

Since the polarized light separator 70, the color filters 84 and the transparent electrodes 36 are provided inward of the glass substrate 24, occurrence of parallax can be prevented.

Further, since the transparent electrodes 36 are provided inward of the polarized light separator 70, the driving voltage can be decreased and sharpness of on-off switching can be improved.

Figure 8:
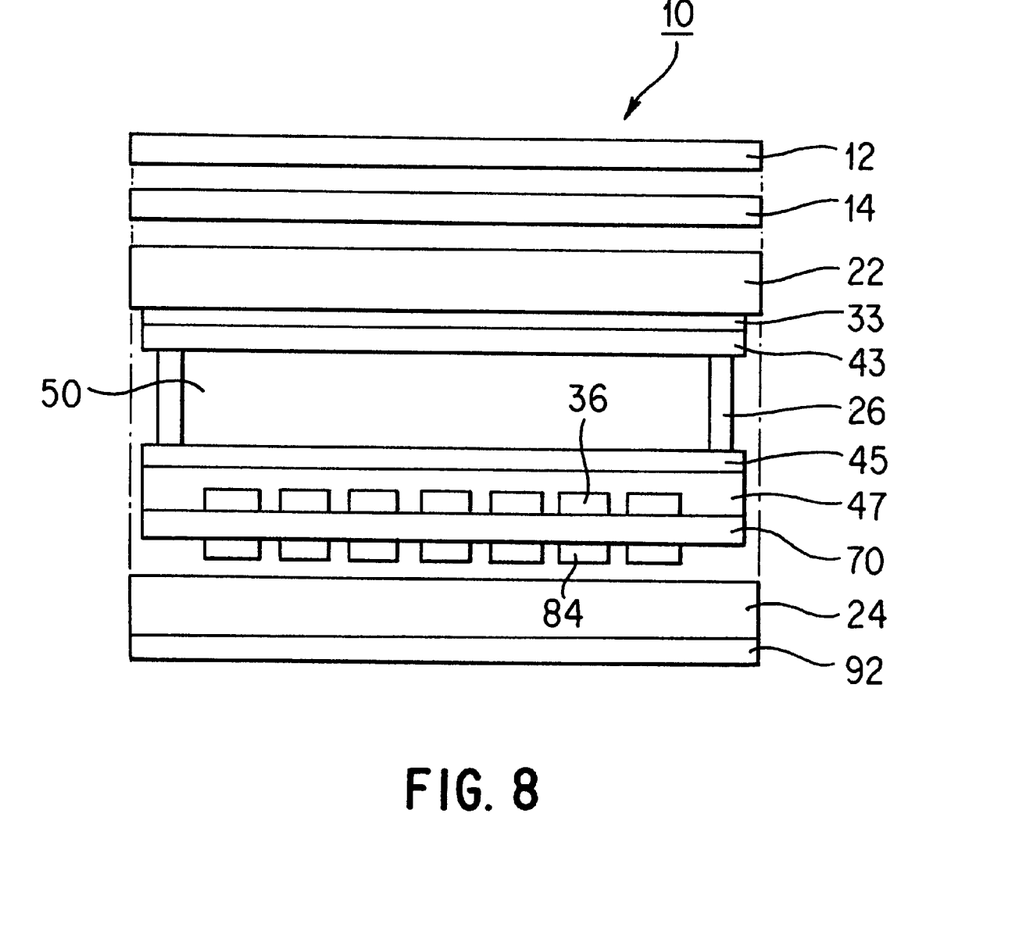
FIG. 8 is an exploded sectional view illustrating a liquid crystal display device in accordance with a fourth embodiment of the present invention.

FIG. 8 is an exploded sectional view illustrating a liquid crystal display device in accordance with a fourth embodiment of the present invention.

In the third embodiment, the diffusion layer 62 is provided on the polarized light separator 70 and the transparent electrodes 36, and the oriented film 45 is provided on the diffusion layer 62, the diffusion layer 62 being used for flattening. However, the fourth embodiment is the same as the third embodiment except that an overcoat layer 47 for flattening is provided on the polarized light separator 70 and the transparent electrodes 36, the oriented film 45 containing micropearl is provided on the overcoat layer 47, and the oriented film 45 serves as both the diffusion layer and the oriented film. This embodiment is also the same as the third embodiment in that as the polarized light separator 70, the polarized light separator disclosed as a reflective polarizer in International Unexamined Application (International Unexamined Publication No. WO95/17692) is used, that without application of a voltage, polarized light is reflected by the polarized light separator 70, not absorbed thereby, thereby obtaining a bright display, and that since the polarized light separator 70, the color filters 84 and the transparent electrodes 24 are provided inward of the glass substrate 24, it is possible to prevent occurrence of parallax. This embodiment is further the same as the third embodiment in that since the transparent electrodes 36 are provided inward of the polarized light separator 70, the driving voltage can be decreased, and sharpness of on-off switching can be improved.

In each of the above embodiments, the aluminum electrodes 34 and the transparent electrodes 36 and 37 may be driven by a switching element such as TFT, MIN or the like.

Figure 9:
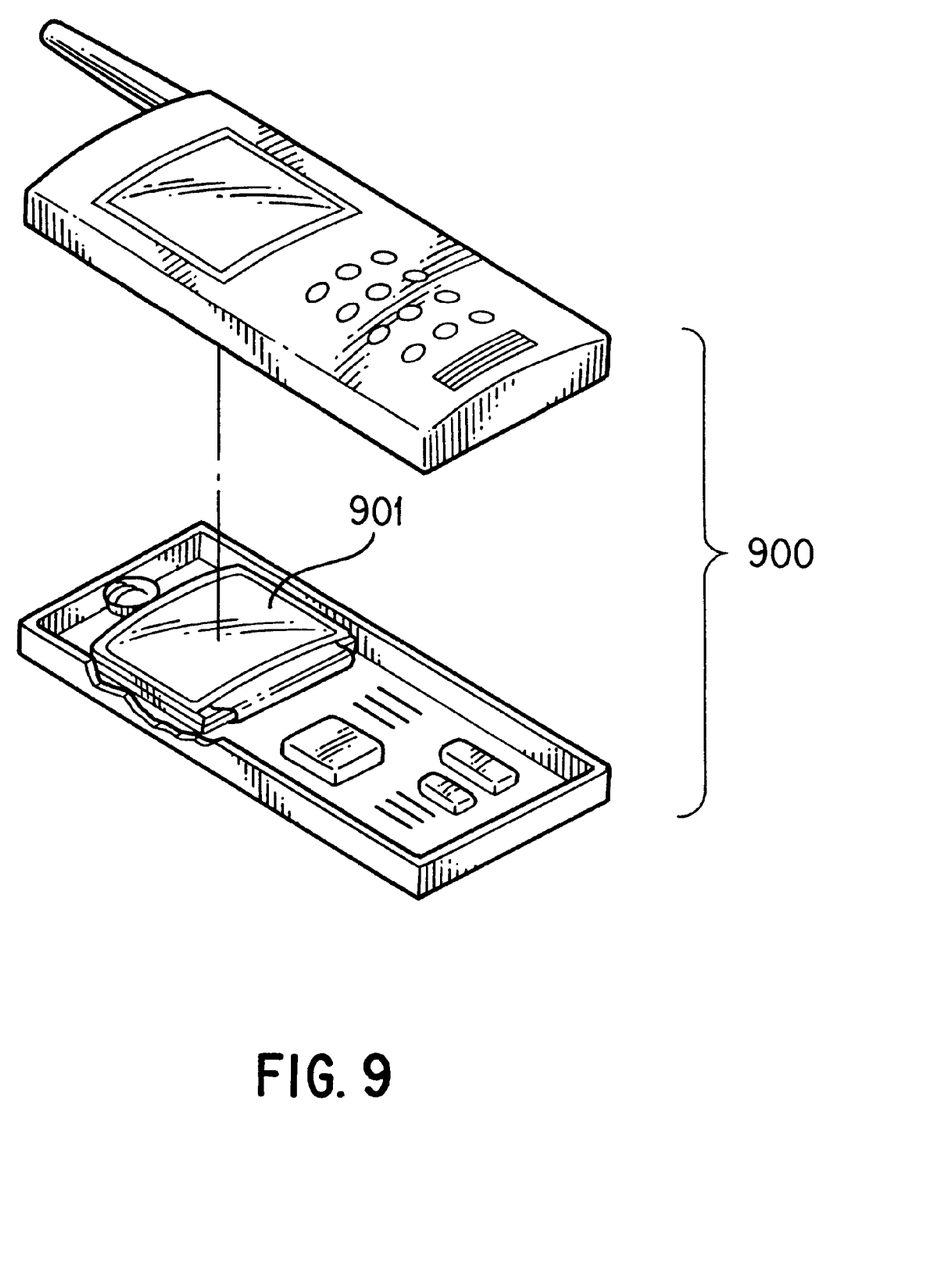
FIG. 9 is a perspective view illustrating an electronic apparatus in accordance with a fifth embodiment of the present invention.

FIG. 9 shows an example of a portable telephone 900 comprising the display device of the present invention. In a portable telephone 900, the display device of the first embodiment is used as a display unit 901.

Although, in this embodiment, the display device of the first embodiment is used, the display device of any one of the first to fourth embodiments can be used according to application.

Although this embodiment concerns the portable telephone as an example, the display device of the present invention can be applied to various electronic apparatus such as a personal computer, a car navigation unit, an electronic device, etc.

In the display device of the present invention, the two display states including the first display state caused by the light reflected from the second polarized light separator and the second display state caused by the light transmitted through the second polarized light separator can be obtained, and the first display is caused by the light reflected from the second polarized light separator and thus becomes a bright display.

What is claimed is:

1. A display device comprising:

transmission polarization axis changing means for changing a transmission polarization axis;

first and second polarized light separating means disposed on both sides of the transmission polarization axis changing means holding the transmission polarization axis changing means therebetween; and a substrate disposed on an opposite side of the second polarized light separating means with respect to the transmission polarization axis changing means;

wherein the first polarized light separating means has first and second sides and emits light incident on the first side as linearly-polarized light in a predetermined first direction from the second side, and emits light incident on the second side as linearly-polarized light in the predetermined first direction from the first side; and the second polarized light separating means has first and second sides, the first side facing the substrate, the second side facing the transmission polarization axis changing means, a linearly-polarized light component in a predetermined second direction of light incident on the second side is transmitted to the first side, and a linearly-polarized light component in a predetermined third direction perpendicular to the predetermined second direction of light incident on the second side is reflected to the second side, and the light incident on the first side is emitted to the transmission polarization axis changing means as linearly-polarized light in the predetermined second direction.

2. A display device according to claim 1, wherein the second polarized light separating means transmits a linearly-polarized component in the predetermined second direction of light incident on the second side over a substantially whole wavelength range in a visible light region to the first side, and reflects a linearly-polarized light component in the predetermined third direction to the second side, and emits a linearly-polarized light component in the predetermined second direction of light incident on the first side over the substantially whole wavelength range in the visible light region to the transmission polarization axis changing means.

3. A display device according to claim 1, wherein the second polarized light separating means transmits a linearly-polarized light component in the predetermined second direction of light incident on the second side, as linearly-polarized light in the predetermined second direction to the first side.

4. A display device according to claim 1, wherein the second polarized light separating means comprises a laminate having a plurality of layers, adjacent ones of the layers having a same refractive index in the predetermined second direction, and different refractive indexes in the predetermined third direction.

5. A display device according to claim 1, wherein the transmission polarization axis changing means comprises a liquid crystal element.

6. A display device according to claim 5, wherein the transmission polarization axis changing means comprises a twisted nematic liquid crystal element, a super-twisted nematic liquid crystal element or an electrically-controlled birefringence liquid crystal element.

7. A display device according to claim 1, wherein the first polarized light separating means comprises a polarizer.

8. A display device according to claim 1, further comprising an optical element which is arranged on an opposite side of the second polarized light separating means with respect to the transmission polarization axis changing means, and which emits light from the second polarized light separating means in a predetermined wavelength region to the second polarized light separating means.

9. A display device according to claim 8, wherein the optical element absorbs light from the second polarized light separating means in a wavelength region other than the predetermined wavelength region, reflects light in the predetermined wavelength region to the second polarized light separating means, and transmits light in the predetermined wavelength region.

10. A display device according to claim 9, wherein the optical element comprises a color filter.

11. A display device according to claim 8, wherein the optical element emits light from the second polarized light separating means in the predetermined wavelength region.

12. A display device according to claim 11, wherein the optical element comprises a fluorescent material.

13. A display device according to claim 8, wherein the optical element comprises a hologram that emits light in the predetermined wavelength region using the light from the second polarized light separating means.

14. A display device according to claim 8, further comprising:
reflecting means disposed on an opposite side of the optical element with respect to the second polarized light separating means;
wherein the reflecting means reflects at least light in the predetermined wavelength region to the optical element.

15. A display device according to claim 1, further comprising a second optical element which is disposed on an opposite side of the second polarized light separating means with respect to the transmission polarization axis changing means and which absorbs light within the substantially whole wavelength range in the visible light region.

16. A display device according to claim 1, further comprising reflecting means disposed on an opposite side of the second polarized light separating means with respect to the transmission polarization axis changing means.

17. A display device according to claim 1, wherein the substrate is a glass substrate.

18. A display device according to claim 1, wherein the substrate is a plastic film substrate.

19. A display device according to claim 1, further comprising first and second electrodes disposed on both sides of the transmission polarization axis changing means.

20. A display device according to claim 19, wherein the first electrode is a transparent electrode disposed on a same side of the transmission polarization axis changing means as the first polarized light separating means, and the second electrode is a reflector disposed between the second polarized light separating means and the substrate.

21. A display device according to claim 19, wherein the first electrode is a transparent electrode disposed on a same side of the transmission polarization axis changing means as the first polarized light separating means, the second electrode is a transparent electrode disposed between the second polarized light separating means and the substrate, further comprising reflecting means disposed on an opposite side of the second electrode with respect to the second polarized light separating means.

22. A display device according to claim 19, wherein the first electrode is a transparent electrode disposed on a same side of the first polarized light separating means as the transmission polarization axis changing means, the second electrode is a transparent electrode disposed between the transmission polarization axis changing means and the second polarized light separating means, further comprising reflecting means disposed on an opposite side of the second polarized light separating means with respect to the transparent electrode.

23. A display device according to claim 22, wherein the reflecting means is provided on an opposite side of the substrate with respect to the second polarized light separating means.

24. A display device according to claim 19, wherein the second electrode comprises a plurality of sub-electrodes disposed in a matrix, a switching element being electrically connected to each of the sub-electrodes.

25. A display device according to claim 1, further comprising a plurality of third optical elements which are disposed on an opposite side of the second polarized light separating means with respect to the transmission polarization axis changing means and in correspondence with respective display dots, and each of which emits light from the second polarized light separating means in the predetermined wavelength region to the second polarized light separating means.

26. A display device according to claim 25, wherein the third optical elements comprise color filters.

27. A display device according to claim 1, further comprising light scattering means.

28. An electronic apparatus including a display device comprising:
transmission polarization axis changing means for changing a transmission polarization axis;
first and second polarized light separating means disposed on both sides of the transmission polarization axis changing means holding the transmission polarization axis changing means therebetween; and
a substrate disposed on an opposite side of the second polarized light separating means with respect to the transmission polarization axis changing means;
wherein the first polarized light separating means has first and second sides and emits light incident on the first side as linearly-polarized light in a predetermined first direction from the second side, and emits light incident on the second side as linearly-polarized light in the predetermined first direction from the first side; and
the second polarized light separating means has first and second sides, the first side facing the substrate, the second side facing the transmission polarization axis changing means, a linearly-polarized light component in a predetermined second direction of light incident on the second side is transmitted to the first side, and a linearly-polarized light component in a predetermined third direction perpendicular to the predetermined second direction of light incident on the second side is reflected to the second side, and the light incident on the first side is emitted to the transmission polarization axis changing means as linearly-polarized light in the predetermined second direction.

29. A display device including a liquid crystal positioned between a first substrate and a second substrate, the display device comprising:

a polarizer disposed on an opposite side of said liquid crystal with respect to said first substrate, the polarizer transmitting light incident thereon as linearly polarized light in a predetermined direction;

a polarized light separator reflecting or transmitting light incident on said polarized light separator, depending on a polarization direction of the incident light;

a first electrode disposed on said first substrate; and a second electrode disposed on said second substrate, said second electrode and said polarized light separator being arranged between the liquid crystal and said second substrate.

30. The display device according to claim 29, said polarized light separator comprising a laminate having a plurality of layers, adjacent ones of the layers having a same refractive index in a direction for transmitting light, and a different refractive index in a direction for reflecting light.

31. The display device according to claim 29, further comprising an optical element selected from a color filter, a fluorescent material, a hologram and a light absorber, the optical element arranged on an opposite side of said optical element with respect to said polarized light separator.

32. The display device according to claim 31, further comprising a reflector arranged on an opposite side of said optical element with respect to said polarized light separator.

33. The display device according to claim 29, said first electrode being capable of transmitting light, and said second electrode being capable of reflecting light.

34. The display device according to claim 29, further comprising:

a reflector disposed on an opposite side of said second electrode with said polarized light separator, said first electrode and said second electrode being capable of transmitting light.

35. An electronic apparatus including a display device which includes a liquid crystal positioned between a first substrate and a second substrate, the display device comprising:

a polarizer disposed on an opposite side of said liquid crystal with respect to said first substrate, the polarizer transmitting light incident thereon as linearly polarized light in a predetermined direction;

a polarized light separator reflecting or transmitting light incident on said polarized light separator, depending on a polarization direction of the incident light;

a first electrode disposed on said first substrate; and a second electrode disposed on said second substrate, said second electrode and said polarized light separator being arranged between the liquid crystal and said second substrate.

* * * * *